US012784237B2

(12) United States Patent
Imamura et al.

(10) Patent No.: US 12,784,237 B2
(45) Date of Patent: Nov. 3, 2026

(54) INFORMATION PROCESSING SYSTEM, INFORMATION PROCESSING METHOD, AND PRESENTATION CONTROL APPARATUS

(71) Applicant: Sony Group Corporation, Tokyo (JP)

(72) Inventors: Hiroshi Imamura, Tokyo (JP); Kosuke Yoshitomi, Tokyo (JP); Hiroyuki Kubota, Tokyo (JP); Tetsuhiro Uchida, Tokyo (JP); Ken Kawamura, Tokyo (JP); Seishi Tomonaga, Tokyo (JP); Takashi Takamatsu, Tokyo (JP)

(73) Assignee: Sony Group Corporation, Tokyo (JP)

( * ) Notice: Subject to any disclaimer, the term of this patent is extended or adjusted under 35 U.S.C. 154(b) by 118 days.

(21) Appl. No.: 18/846,691

(22) PCT Filed: May 8, 2023

(86) PCT No.: PCT/JP2023/017344
§ 371 (c)(1),
(2) Date: Sep. 13, 2024

(87) PCT Pub. No.: WO2023/223875
PCT Pub. Date: Nov. 23, 2023

(65) Prior Publication Data

US 2025/0209638 A1 Jun. 26, 2025

(30) Foreign Application Priority Data

May 18, 2022 (JP) ................................ 2022-081521

(51) Int. Cl.
*G06T 7/246* (2017.01)
*G06F 3/16* (2006.01)
(Continued)

(52) U.S. Cl.
CPC .............. *G06T 7/246* (2017.01); *G06F 3/167* (2013.01); *G06T 11/00* (2013.01); *G06T 11/10* (2026.01);
(Continued)

(58) Field of Classification Search
CPC ......... G06T 7/246; G06T 11/00; G06T 11/10; G06T 2207/10016; G06T 2207/10024;
(Continued)

(56) References Cited

U.S. PATENT DOCUMENTS 10,983,515 B2 * 4/2021 Choe .................... G05D 1/0038
2016/0094765 A1 3/2016 Ardö et al.
(Continued)

FOREIGN PATENT DOCUMENTS

WO 2017/042903 A1 3/2017

OTHER PUBLICATIONS

International Search Report and Written Opinion mailed on Jun. 20, 2023, received for PCT Application PCT/JP2023/017344, filed on May 8, 2023, 8 pages.

*Primary Examiner* — Said Broome
*Assistant Examiner* — Andrew Shin
(74) *Attorney, Agent, or Firm* — XSENSUS LLP

(57) ABSTRACT

Disclosed herein is an information processing system including circuitry configured to acquire a video signal from which a motion component has been removed, acquire information corresponding to the motion component, and display a video corresponding to the video signal from which the motion component has been removed, the video having the information corresponding to the motion component visually superimposed thereon.

16 Claims, 12 Drawing Sheets

(51) Int. Cl.
*G06T 11/00* (2026.01)
*G06T 11/10* (2026.01)

(52) U.S. Cl.
CPC ............... *G06T 2207/10016* (2013.01); *G06T 2207/10024* (2013.01); *G06T 2207/30252* (2013.01)

(58) Field of Classification Search
CPC .......... G06T 2207/30252; G06F 3/167; G05D 1/2249; G05D 2107/13; G05D 2109/10; G16Y 10/40; G16Y 20/10; G16Y 20/20; G16Y 40/60
See application file for complete search history.

(56) References Cited

U.S. PATENT DOCUMENTS

| | | | | |
|---|---|---|---|---|
| 2016/0355131 | A1* | 12/2016 | Murasumi ............... | G06T 11/60 |
| 2019/0045319 | A1 | 2/2019 | Hotary | |
| 2019/0139286 | A1* | 5/2019 | Shimoda ............. | B60K 35/211 |

* cited by examiner

[Fig. 1]
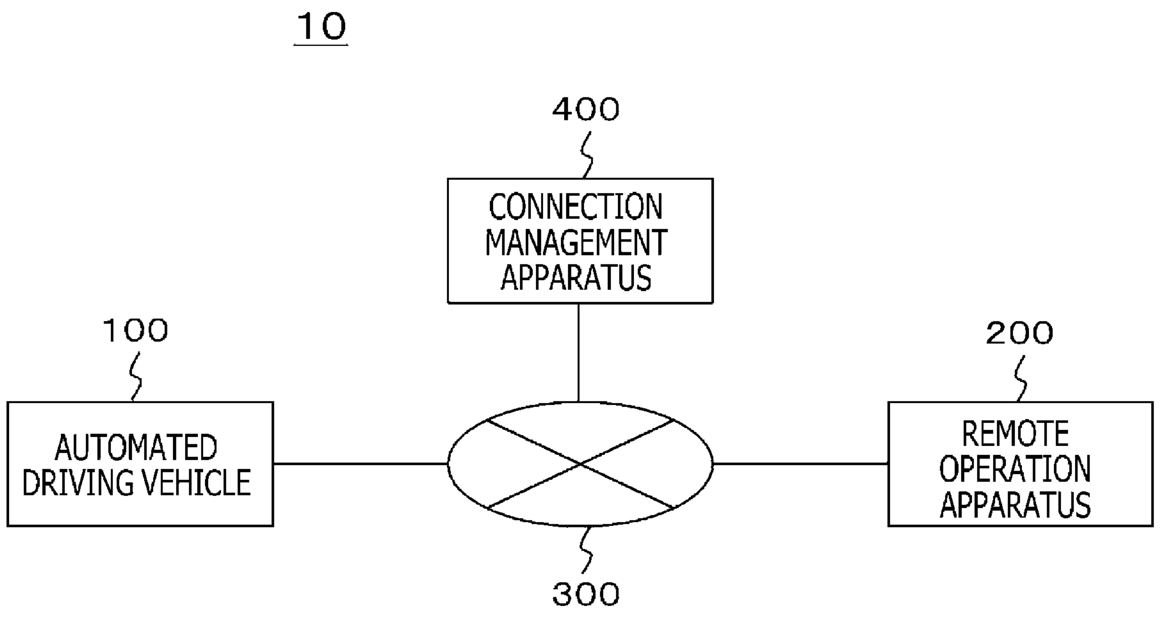

[Fig. 2]
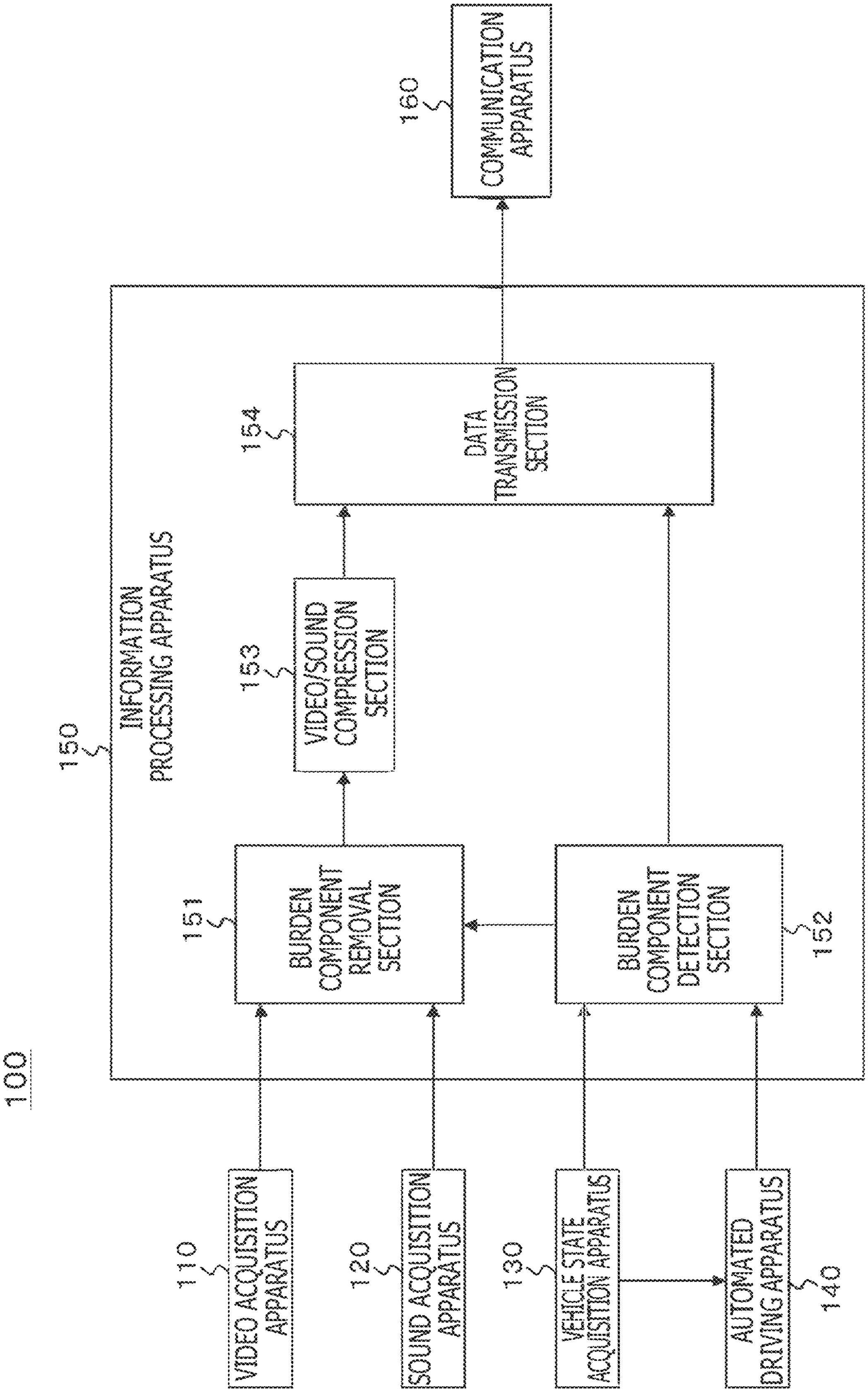

[Fig. 3]
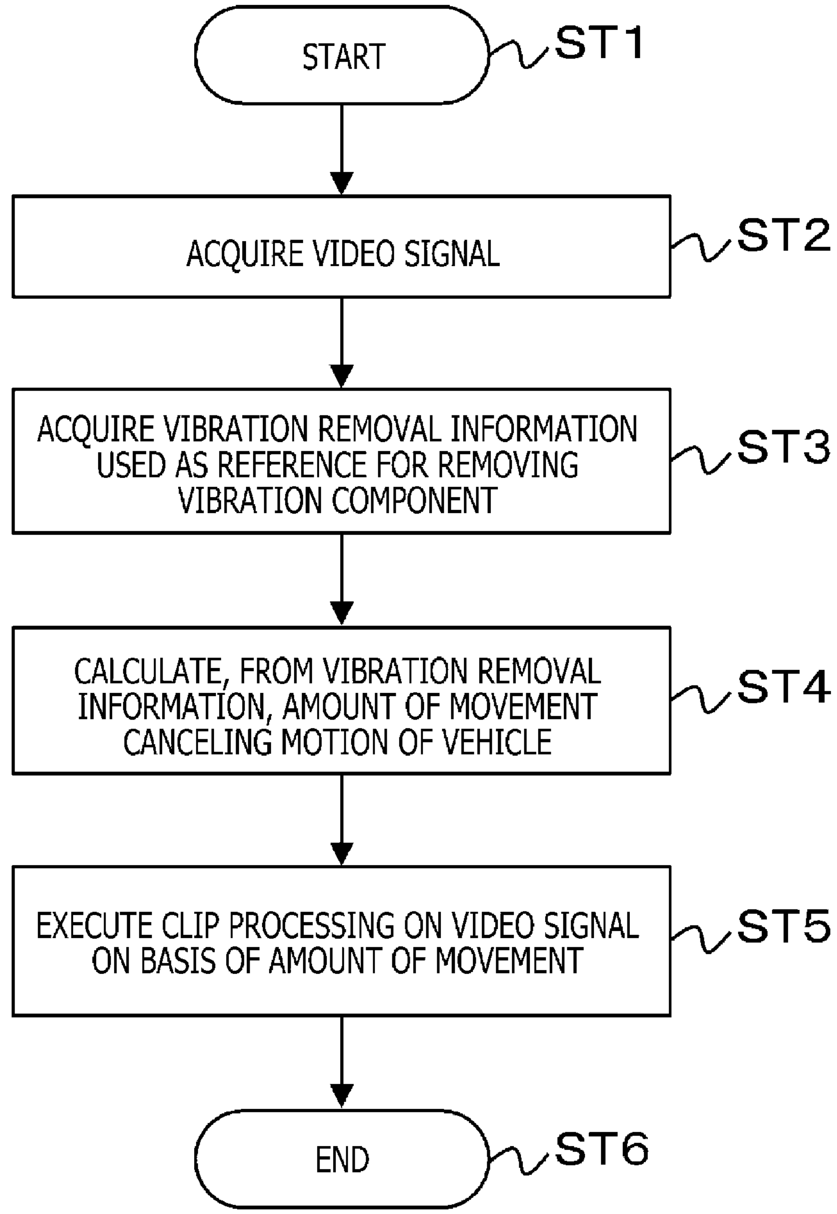

[Fig. 4]
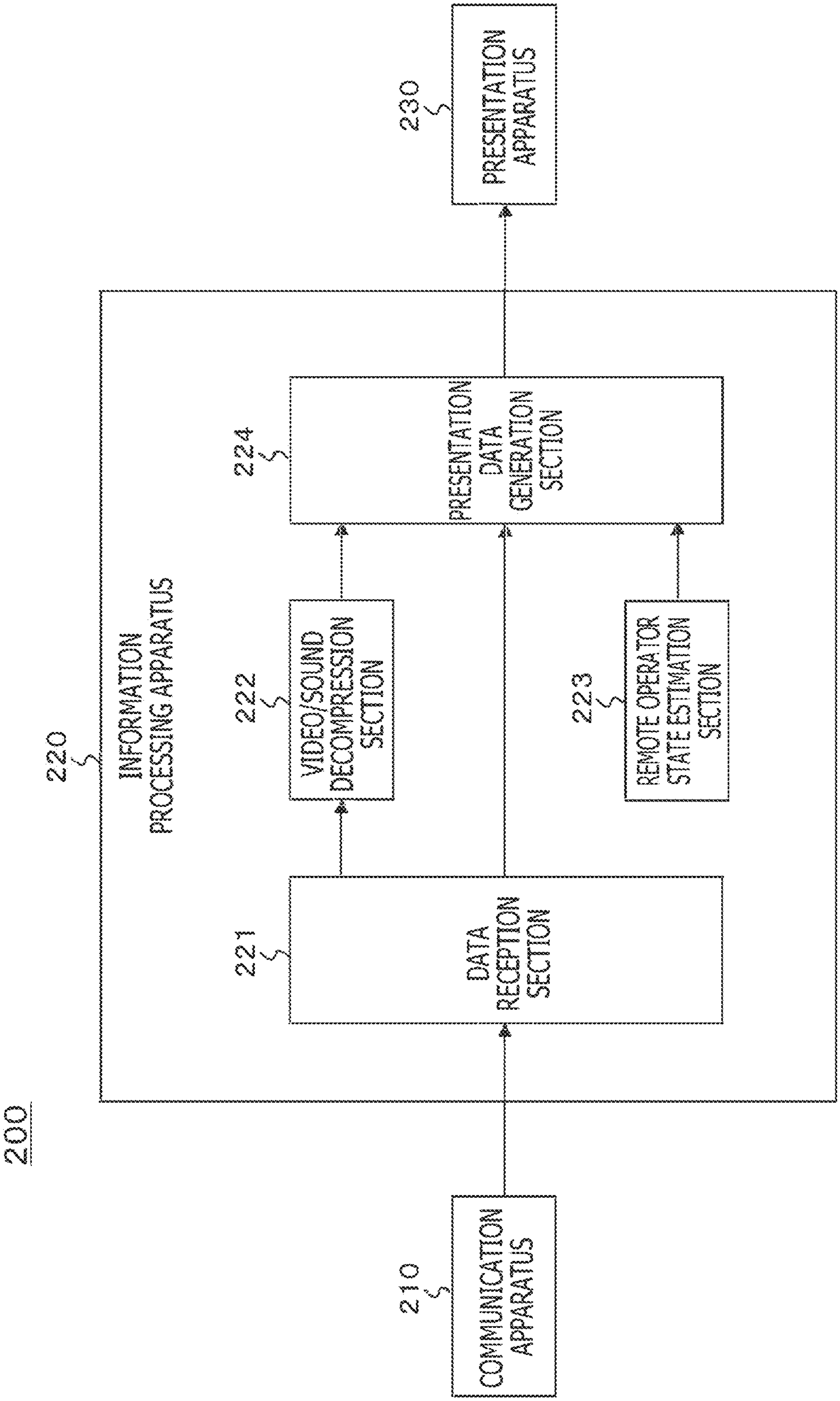

[Fig. 5]
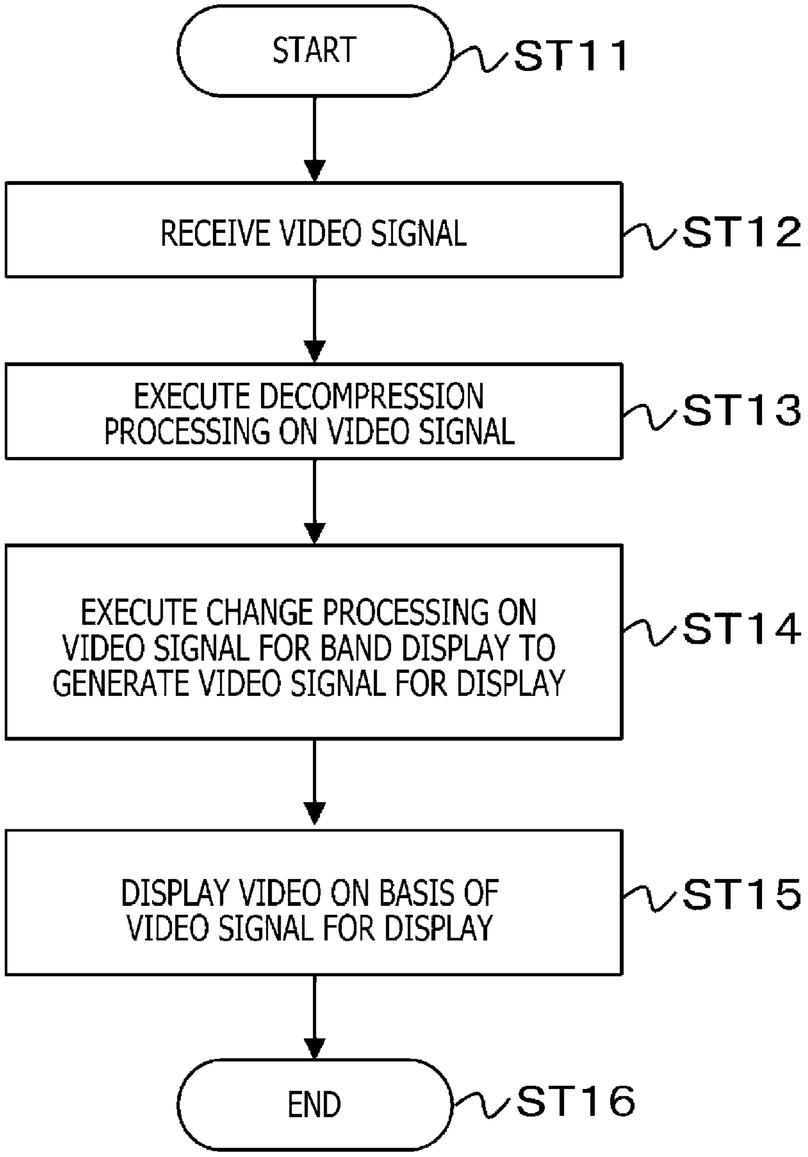

[Fig. 6]
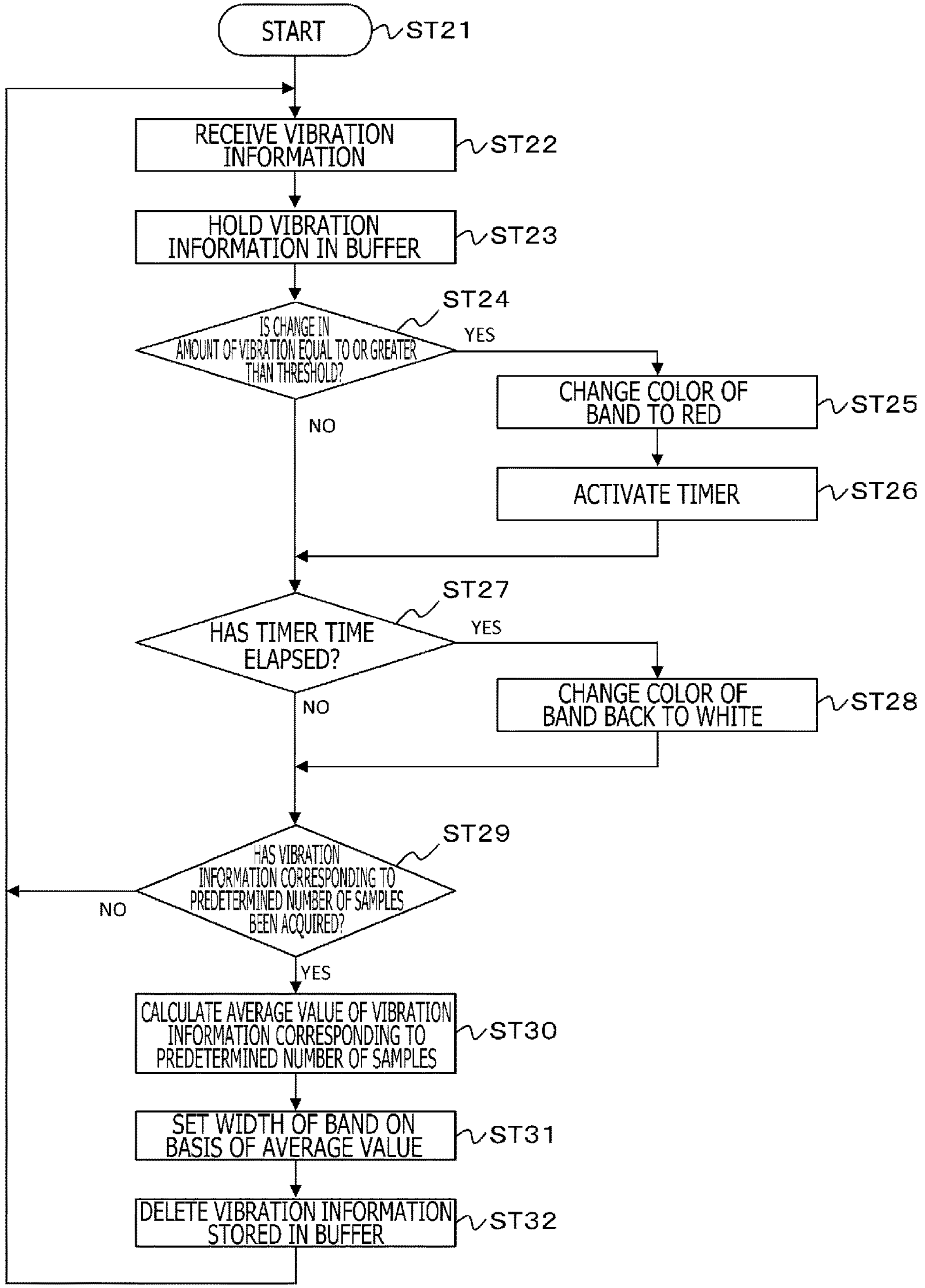

[Fig. 7]
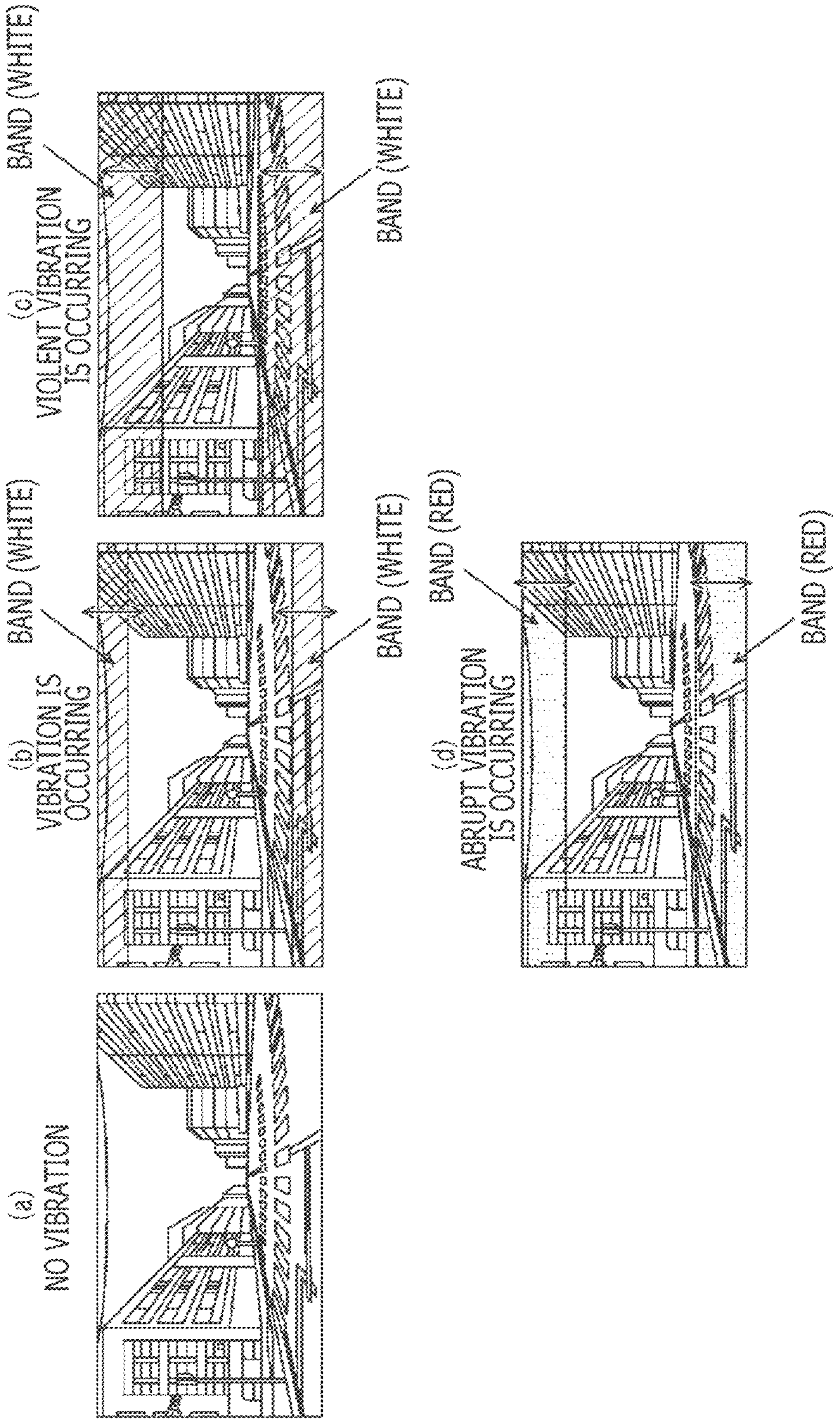

[Fig. 8]
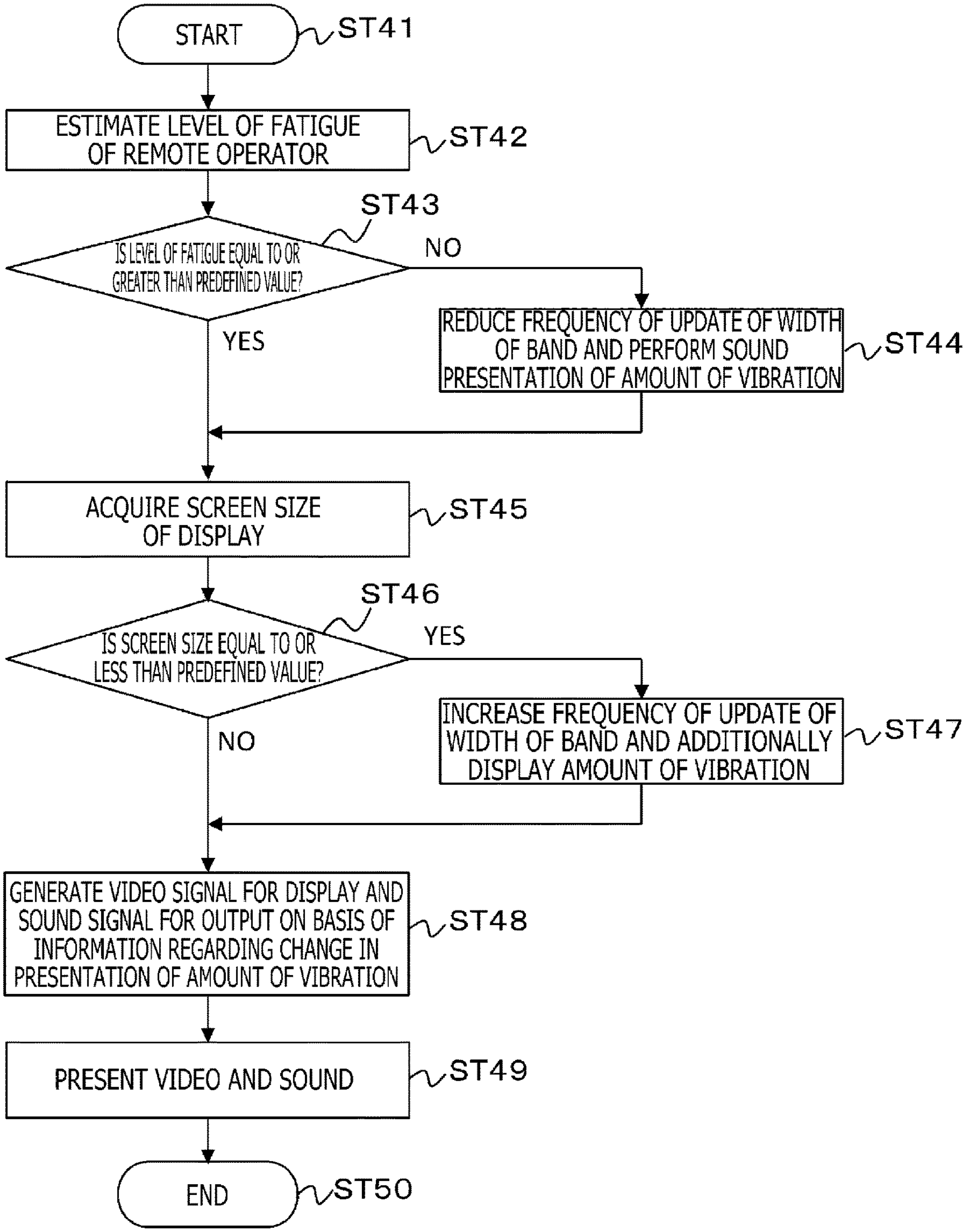

[Fig. 9]
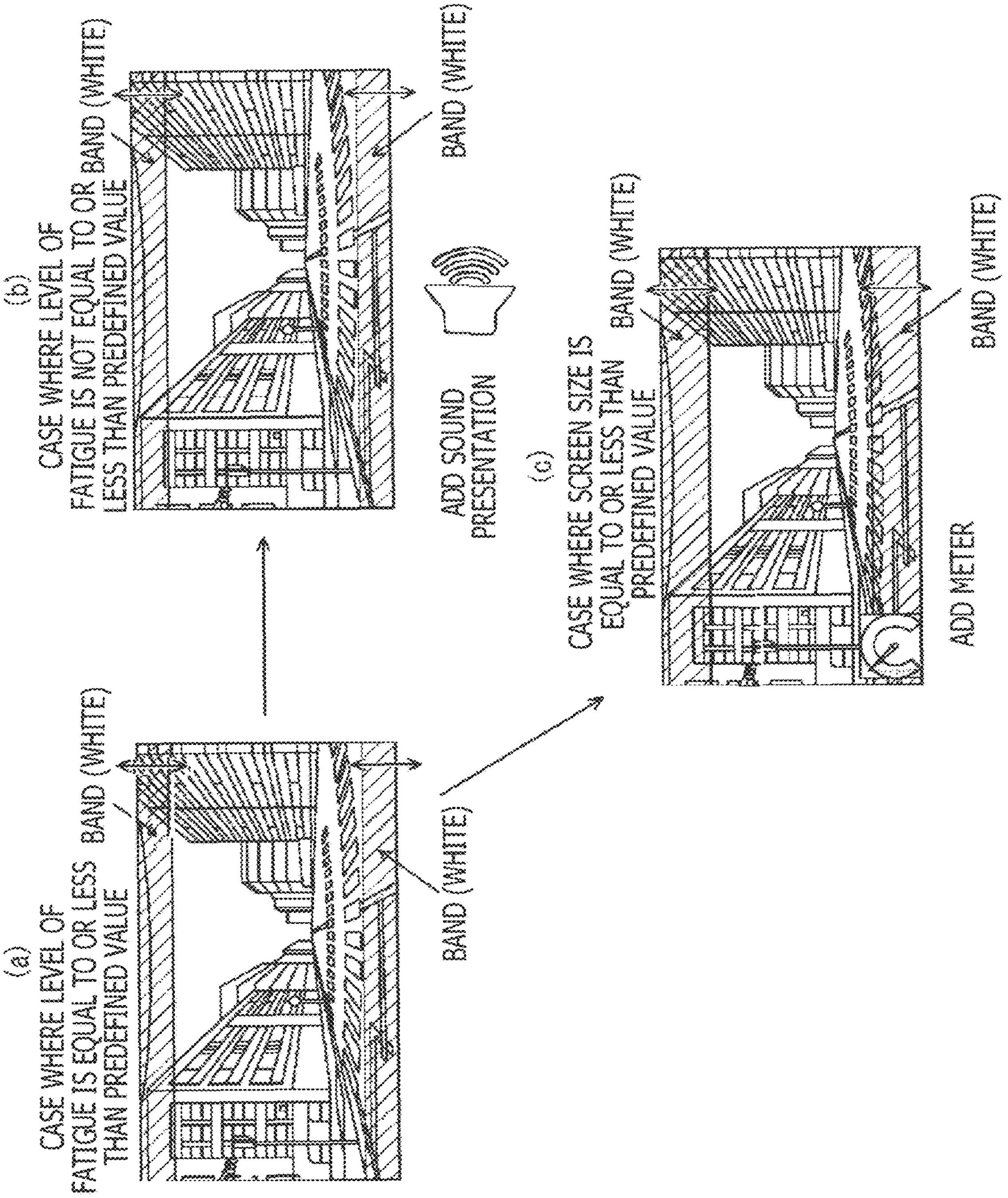

[Fig. 10]
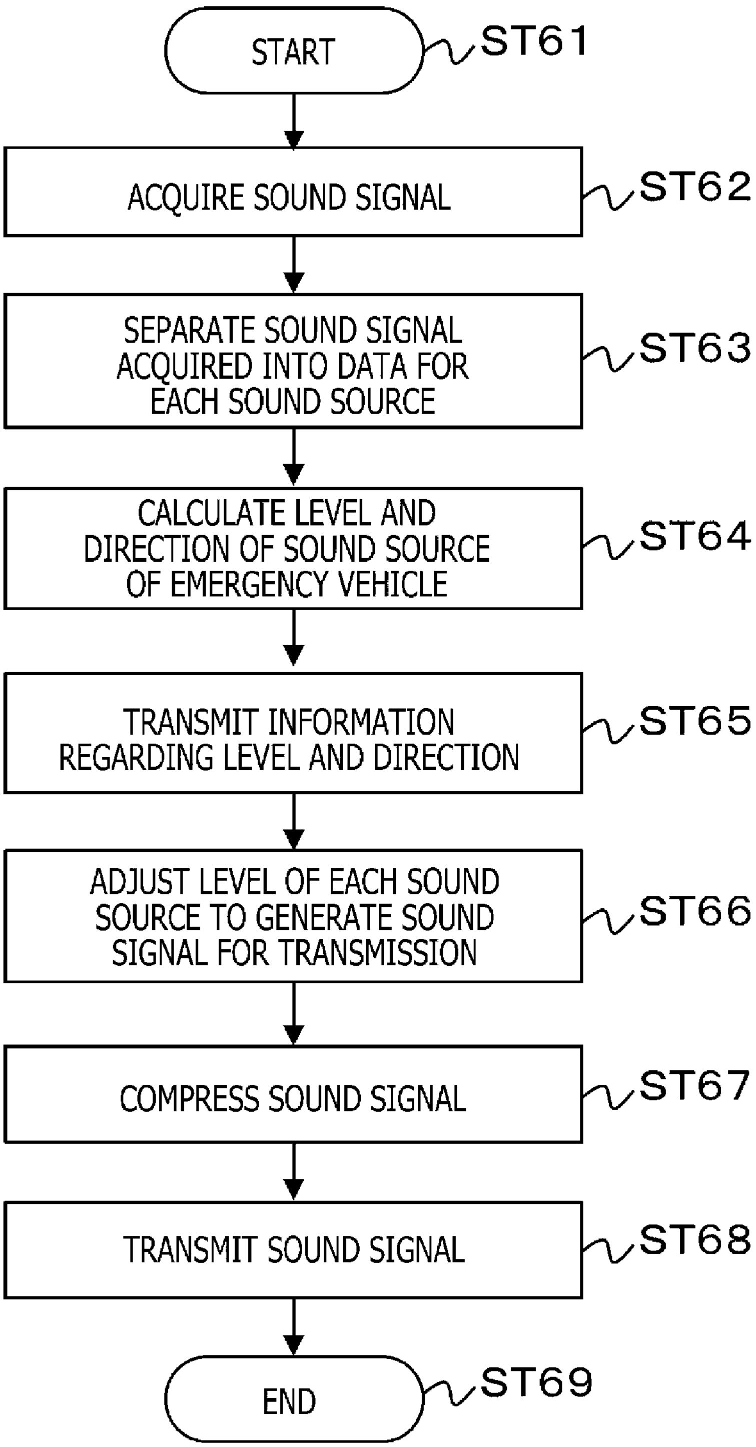

[Fig. 11]
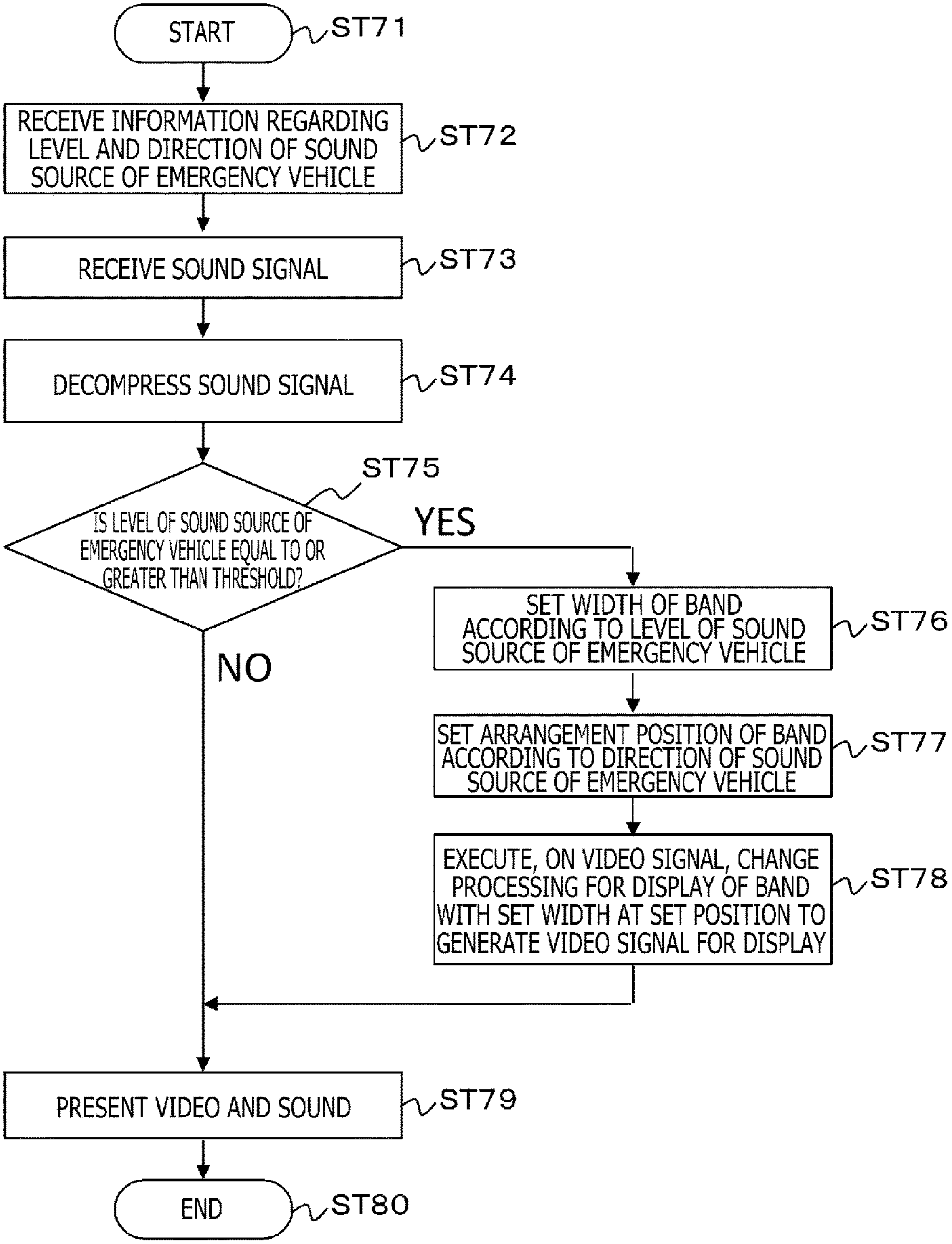

[Fig. 12]
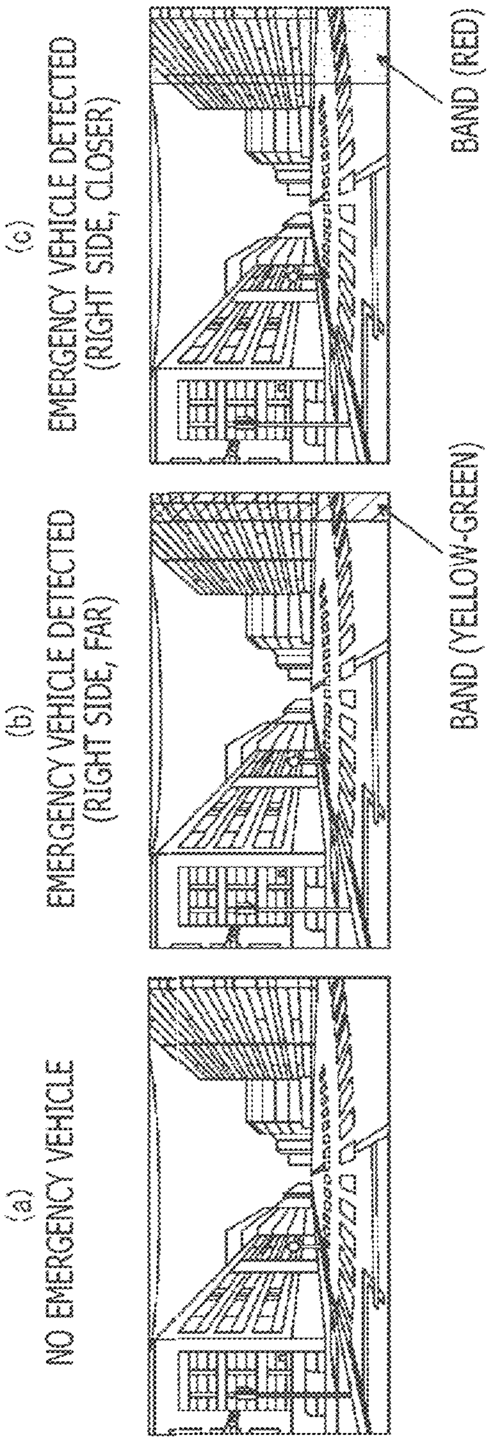

INFORMATION PROCESSING SYSTEM, INFORMATION PROCESSING METHOD, AND PRESENTATION CONTROL APPARATUS

CROSS-REFERENCE TO RELATED APPLICATIONS

This application is based on PCT filing PCT/JP2023/017344, filed on May 8, 2023, which claims the benefit of Japanese Priority Patent Application JP 2022-081521 filed May 18, 2022, the entire contents of each are incorporated herein by reference.

TECHNICAL FIELD

The present technology relates to an information processing system, an information processing method, and a presentation control apparatus, and in particular, to an information processing system, for example, suitably applied to a remote control system.

BACKGROUND ART

In recent years, development of automated driving technology has been accelerating. The automated driving technology enables driverless driving requiring no driver on a vehicle side, leading to an expectation that the automated driving technology is applied to various vehicles ranging from commercial vehicles such as buses, taxies, and truck to personal automobiles. However, unlike on test courses, on general roads, automated driving vehicles need to be capable of traveling safely under a wide variety of conditions (surrounding vehicles, weather, obstacles, bicycles, pedestrians, and the like). Accordingly, many years are expected to be required to realize autonomous driving that requires absolutely no operator.

Under such circumstances, attention has been paid to a remote operation technology as a technology in which an automated driving vehicle is connected to an operator (remote operator, remote assistant or remote driver) who is at a remote location, via a network, and in which the remote operator remotely operates and monitors the automated driving vehicle for a case that is difficult to be addressed by the automated driving vehicle.

A problem that may occur during remote operation is that video and sound acquired by the automated driving vehicle include a burden component that imposes a burden on the remote operator (user). For example, video acquired during vehicle traveling includes a vibration component (motion component, shaking component) attributed to road conditions or acceleration and deceleration. The remote operation prevents vibration of the remotely operated vehicle from being felt, and thus, when a vibration component in the video is presented to the remote operator with no processing executed on the video, the remote operator may be induced to feel sick due to a difference between the bodily feeling and visual sense of the remote operator.

For prevention of the sickness, the video is desirably presented to the remote operator after the vibration component contained in the video is removed from the video. For example, PTL 1 describes a technology for removing the vibration component in the video.

However, removing the vibration component leads to difficulty in determining, from the video, the behavior of the vehicle related to the vibration. Accordingly, there is a possibility that the remote operator makes erroneous determination on the state of the vehicle. As a result, safety and comfortableness of passengers are assumed to be degraded.

In the related art, there has been proposed a technology in which vibration information regarding the automated driving vehicle is transmitted to the remote operator side and in which an operator seat of the remote operator is moved on the basis of the vibration information to match the video with vibration propagated from the operator seat, mitigating the feeling of strangeness and sickness. However, this technology requires an apparatus that moves the operator seat, resulting in a large and complicated apparatus for the operation, and thus, it has been difficult to easily install and introduce such an apparatus. In addition, although the vibration of the operator seat mitigates the uncomfortableness felt through the visual sense and thus alleviates the sickness, a problem with this technology is that the vibration of the operator seat leads to fatigue.

CITATION LIST

Patent Literature

PTL 1: PCT Patent Publication No. WO 2017/042903

SUMMARY OF INVENTION

Technical Problem

It is desirable to, for example, allow a remote operator to appropriately perform remote operation.

Solution to Problem

A concept of the present technology lies in an information processing system including a presentation signal acquisition section that acquires a presentation signal from which a burden component imposing a burden on a user has been removed, an information acquisition section that acquires information corresponding to the burden component, and a presentation control section that controls presentation based on the presentation signal from which the burden component has been removed and presentation based on the information corresponding to the burden component.

In the present technology, the presentation signal acquisition section acquires the presentation signal from which the burden component imposing a burden on the user has been removed. For example, the presentation signal acquisition section may be configured to process the presentation signal including the burden component, on the basis of information regarding the burden component, to acquire the presentation signal from which the burden component has been removed. In addition, for example, the presentation signal from which the burden component has been removed may be a presentation signal based on a presentation signal acquired by a presentation signal acquisition apparatus mounted in a vehicle.

The information acquisition section acquires information corresponding to the burden component. Then, the presentation control section performs the presentation based on the presentation signal from which the burden component has been removed and the presentation based on the information corresponding to the burden component.

For example, the presentation signal may be a video signal, the burden component may be a motion component of video, and the presentation control section may be configured to control presentation based on a video signal from which the motion component of the video has been removed and presentation based on information corresponding to the motion component of the video. In this case, the video from which the motion component, for example, a vibration component, has been removed is displayed, thus suppressing imposition of a burden on the user, for example, induction of sickness or the like. In addition, the presentation based on the information corresponding to the motion component of the video (presentation based on display, sound, or the like) is performed, thus enabling the user to recognize the motion of the video removed from the video, for example, information regarding vibration.

In this case, for example, the presentation control section may be configured to display a band in such a manner that the band overlaps the video provided by the video signal, the band having a width updated depending on an amount of motion of the video. In this case, the user can easily recognize the amount of motion of the video (magnitude of the motion), for example, the amount of vibration of the video (magnitude of the vibration), from the width of the band displayed in such a manner as to overlap the video.

In this case, for example, the presentation control section may be configured to change an aspect of the band, for example, a color, a pattern, or the like of the band, when a change in the amount of motion of the video is equal to or greater than a threshold. Thus, the user can swiftly recognize occurrence of abrupt motion of the video, for example, occurrence of abrupt vibration.

In addition, for example, the presentation signal may be a sound signal, the burden component may be a predetermined sound source component, and the presentation control section may be configured to control presentation based on a sound signal from which the predetermined sound source component has been removed and presentation based on information corresponding to the predetermined sound source component. In this case, the sound from which the predetermined sound source component has been removed is output, thus suppressing imposition of a burden on the user, an increase in the level of fatigue, and the like. In addition, the presentation based on information corresponding to the predetermined sound source component (presentation based on display, sound, or the like) is performed, thus enabling the user to recognize information regarding the predetermined sound source component removed from the sound.

In this case, for example, the presentation control section may be configured to display a band in such a manner that the band overlaps video provided by a video signal, the band having a width updated depending on a level of the predetermined sound source. In this case, the user can easily recognize the level of the predetermined sound source from the width of the band displayed in such a manner as to overlap the video.

As described above, the present technology performs the presentation based on the presentation signal from which the burden component has been removed and the presentation based on the information corresponding to the burden component. Since the presentation based on the presentation signal from which the burden component has been removed is performed, imposition of a burden on the user is suppressed. In addition, since the presentation based on the information corresponding to the burden component is performed, the user can easily recognize the burden component removed from the presentation signal. Accordingly, for example, the remote operator (also called user, remote assistant or remote driver herein) can appropriately perform remote operation.

In addition, another concept of the present technology lies in an information processing method including presentation signal acquisition of acquiring a presentation signal from which a burden component imposing a burden on a user has been removed, information acquisition of acquiring information corresponding to the burden component, and presentation control of controlling presentation based on the presentation signal from which the burden component has been removed and presentation based on the information corresponding to the burden component.

In addition, another concept of the present technology lies in a presentation control apparatus including a control section that controls presentation based on a presentation signal from which a burden component imposing a burden on a user has been removed and presentation based on information corresponding to the burden component.

In the present technology, the control section controls the presentation based on the presentation signal from which the burden component imposing a burden on the user has been removed and the presentation based on the information corresponding to the burden component. For example, the presentation signal from which the burden component has been removed may be a presentation signal based on a presentation signal acquired by a presentation signal acquisition apparatus (camera, microphone, or the like) mounted in a vehicle.

For example, the presentation signal may be a video signal, the burden component may be a motion component of video, and the control section may be configured to control presentation based on a video signal from which the motion component of the video has been removed and presentation based on the information corresponding to the motion component of the video. In this case, the video from which the motion component, for example, a vibration component, has been removed is displayed, thus suppressing imposition of a burden on the user, for example, induction of sickness or the like. In addition, the presentation based on the information corresponding to the motion component of the video (presentation based on display, sound, or the like) is performed, thus enabling the user to recognize the motion of the video removed from the video, for example, the vibration.

In this case, for example, the control section may be configured to display a band in such a manner that the band overlaps the video provided by the video signal, the band having a width updated depending on an amount of motion of the video. In this case, the user can easily recognize the amount of motion of the video (magnitude of the motion), for example, the amount of vibration of the video (magnitude of the vibration), from the width of the band displayed in such a manner as to overlap the video.

Here, the amount of motion of the video may be an average amount of motion obtained by averaging the amount of motion of the video every predetermined time. This allows suppression of more frequent update of the width of the band than necessary, the band being displayed in such a manner as to overlap the video provided by the video signal. Thus, imposition of a burden such as fatigue on the user can be mitigated.

In addition, in this case, for example, the control section may be configured to change an aspect of the band, for example, a color, a pattern, or the like of the band, when a change in the amount of motion of the video is equal to or greater than a threshold. Thus, the user can recognize occurrence of abrupt motion of the video, for example, occurrence of abrupt vibration.

In addition, in this case, for example, the control section may be configured to change a frequency of update of the width of the band depending on a state of a user. Thus, in a case where the level of fatigue of the user is high, the frequency of update of the width of the band is reduced, suppressing further fatigue of the user. In addition, for example, the control section may be configured to change the frequency of update of the width of the band depending on a screen size of a display on which the video provided by the video signal is displayed. Thus, for example, in a case where the screen size is small, the frequency of update of the width of the band is increased, making the user easily notice a change in the width of the band.

For example, the presentation signal may be a sound signal, the burden component may be a predetermined sound source component, and the control section may be configured to control presentation based on a sound signal from which the predetermined sound source component has been removed and presentation based on information corresponding to the predetermined sound source component. In this case, the sound from which the predetermined sound source component has been removed is output, thus suppressing imposition of a burden on the user, an increase in the level of fatigue, or the like. In addition, the presentation based on the information corresponding to the predetermined sound source component (presentation based on display, sound, or the like) is performed, thus enabling the user to recognize the information regarding the predetermined sound source component removed from the sound.

In this case, for example, the control section may be configured to display a band in such a manner that the band overlaps video provided by a video signal, the band having a width updated depending on a level of the predetermined sound source. In this case, the user can easily recognize the level of the predetermined sound source from the width of the band displayed in such a manner as to overlap the video. Further, in this case, for example, the control section may be configured to change an arrangement position of the band according to a direction of the predetermined sound source. Thus, the user can easily estimate the direction of the predetermined sound source from the arrangement position of the band.

BRIEF DESCRIPTION OF DRAWINGS

FIG. 1 is a block diagram depicting a configuration example of a remote operation system as an embodiment.

FIG. 2 is a block diagram depicting a configuration example of an automated driving vehicle.

FIG. 3 is a flowchart depicting an example of a processing procedure for vibration component removal in a burden component removal section.

FIG. 4 is a block diagram depicting a configuration example of a remote operation apparatus.

FIG. 5 is a flowchart depicting an example of a procedure for processing a video signal for each frame in the remote operation apparatus.

FIG. 6 is a flowchart depicting an example of a procedure for setting a width and a color of a band in a presentation data generation section of an information processing apparatus.

FIG. 7 depicts diagrams each depicting an example of video display in a case where a burden component is a vibration component of video.

FIG. 8 is a flowchart depicting an example of a procedure for processing a video signal and a sound signal for each frame in the remote operation apparatus in a case where a result of estimation of a remote operator state estimation section, for example, is further utilized to present the amount of vibration (magnitude of the vibration).

FIG. 9 depicts diagrams each depicting an example of presentation of the amount of vibration in the remote operator state estimation section in a case where the level of fatigue of the remote operator is further utilized.

FIG. 10 is a diagram depicting an example of a procedure for processing a sound signal in a predetermined period in the automated driving vehicle.

FIG. 11 is a diagram depicting an example of a procedure for processing, in the remote operation apparatus, information regarding the level and the direction of a sound source of the emergency vehicle and the sound signal, the information and the sound signal being transmitted from the automated driving vehicle in the predetermined period.

FIG. 12 depicts diagrams each depicting an example of video display in a case where the burden component is sound generated by the emergency vehicle.

DESCRIPTION OF EMBODIMENT

A mode in which the present technology is implemented (hereinafter referred to as an "embodiment") will be described below. Note that description will be given in the following order.

1. Embodiment
2. Modification

1. Embodiment

Configuration Example of Remote Operation System

FIG. 1 depicts a configuration example of a remote operation system 10 as an embodiment. In the remote operation system 10, an automated driving vehicle 100 is connected to a remote operation apparatus 200 via a network 300. The network 300 is, for example, a cellular network.

In the remote operation system 10, a connection management apparatus 400 is connected to the network 300. The connection management apparatus 400 performs call control when the automated driving vehicle 100 and the remote operation apparatus 200 are connected to each other. Note that, in the illustrated example, the automated driving vehicle 100 and the remote operation apparatus 200 are connected on a one-to-one basis but that, in an alternative possible configuration, one remote operation apparatus 200 may be connected to multiple automated driving vehicles 100.

Operation information for a steering wheel, an accelerator, a brake, and the like provided by a remote operator is transmitted from the remote operation apparatus 200 to the automated driving vehicle 100 as necessary to remotely operate the automated driving vehicle 100.

In addition to a video signal and a sound signal as presentation signals, vehicle state information, automated driving information, and the like are transmitted from the automated driving vehicle 100 to the remote operation apparatus 200, with the contents of the information presented as necessary. Here, the video signal (also called the original video signal herein) is acquired, for example, by a video acquisition apparatus (camera) mounted in the automated driving vehicle 100. In addition, the sound signal (also called the original sound signal herein) is acquired by a sound acquisition apparatus (microphone) mounted in the automated driving vehicle 100.

The vehicle state information is acquired by a vehicle state acquisition apparatus mounted in the automated driving vehicle 100. The vehicle state acquisition apparatus includes an acceleration sensor, a ranging sensor, a GPS (Global Positioning System), a geomagnetic sensor, and the like to acquire various types of vehicle state information. The vehicle state information includes, for example, self-position information, speed information, engine rotation speed information, state information regarding the accelerator and the brake, and further, motion information, as well as, in the present embodiment, vibration information.

The automated driving information is acquired from an automated driving apparatus mounted in the automated driving vehicle 100. The automated driving information includes, for example, route information, acceleration and deceleration information, steering angle information, and the like. Note that the automated driving apparatus references sensing results from the ranging sensor, for example, to set a route and performs automated driving along the route.

In the present embodiment, the video signal and the sound signal transmitted from the automated driving vehicle 100 to the remote operation apparatus 200 are signals from which a burden component has been removed, the burden component imposing a burden on the user (remote operator) and corresponding to, for example, a component causing fatigue, sickness, or the like. The automated driving vehicle 100 transmits, separately from the video signal and the sound signal, information corresponding to the burden component to the remote operation apparatus 200.

The remote operation apparatus 200 performs presentation using a presentation signal from which the burden component has been removed, in other words, the video signal or the sound signal, and further separately performs presentation based on information corresponding to the burden component. The presentation based on the information corresponding to the burden component is performed by display or sound output.

The burden component related to the video signal may be a component such as vibration of video caused by vibration of the automated driving vehicle 100 due to road surface conditions, skew of the video caused by acceleration and deceleration of the automated driving vehicle 100 (yaw, pitch, and roll), and a change in luminance of the video caused by weather or the like. Here, the vibration or skew of the video constitutes motion of the video. In addition, the burden component related to the sound signal may be a component such as noise (sound generated by an emergency vehicle, at a construction site, or the like) generated around the automated driving vehicle 100.

As described above, the presentation based on the presentation signal from which the burden component has been removed is performed, thus suppressing imposition of a burden on the user (remote operator), for example, causing of fatigue or sickness. In addition, the presentation based on the information corresponding to the burden component is performed, thus enabling the user (remote operator) to easily recognize the burden component removed from the presentation signal, for example, vibration or skew otherwise contained in the video, noise otherwise contained in the sound, or the like.

Note that, in the above description, the video signal, the sound signal, the vehicle state information, the automated driving information, and the like are directly transmitted from the automated driving vehicle 100 to the remote operation apparatus 200 but that, in an alternative possible configuration, these types of information may be transmitted via another server, for example, the connection management apparatus 400. In that case, in an alternative possible configuration, instead of the automated driving vehicle 100, the connection management apparatus 400 may acquire the presentation signal (video signal or sound signal) from which the burden component has been removed.

FIG. 2 depicts a configuration example of the automated driving vehicle 100. The automated driving vehicle 100 includes a video acquisition apparatus 110, a sound acquisition apparatus 120, a vehicle state acquisition apparatus 130, an automated driving apparatus 140, an information processing apparatus 150, and a communication apparatus 160.

The video acquisition apparatus 110 is an apparatus for acquiring, as a video signal, a traveling state of the automated driving vehicle 100, and is, for example, a camera. The sound acquisition apparatus 120 is an apparatus for collecting and acquiring, as a sound signal, sound around the automated driving vehicle 100, and is, for example, a microphone.

The vehicle state acquisition apparatus 130 includes a sensor, such as an acceleration sensor, a ranging sensor, a GPS, and a geomagnetic sensor, to acquire various types of vehicle state information, for example, self-position information, acceleration information, engine rotation speed information, state information regarding the accelerator and the brake, and the like.

The automated driving apparatus 140 is an apparatus that executes processing for performing automated driving. The automated driving apparatus 140, for example, senses and recognizes surrounding circumstances on the basis of the ranging sensor and the like provided in the vehicle state acquisition apparatus 130, and uses the results of the sensing and recognition to determine a route of the automated driving vehicle 100. The automated driving apparatus 140 then operates the automated driving vehicle 100 (acceleration and deceleration, steering, and the like) along the route. The automated driving apparatus 140 outputs, for example, route information, acceleration and deceleration information, steering angle information, and the like as automated driving information.

The information processing apparatus 150 generates transmission data to be transmitted to the remote operation apparatus 200, on the basis of the video signal acquired from the video acquisition apparatus 110, the sound signal acquired from the sound acquisition apparatus 120, the vehicle state information acquired from the vehicle state acquisition apparatus 130, the automated driving information output from the automated driving apparatus 140, and the like.

The information processing apparatus 150 includes a burden component removal section 151, a burden component detection section 152, a video/sound compression section 153, and a data transmission section 154. The video/sound compression section 153 is fed, via the burden component removal section 151, with the video signal acquired from the video acquisition apparatus 110 and the sound signal acquired from the sound acquisition apparatus 120. The burden component removal section 151 removes, from the video signal and the sound signal, the burden component imposing a burden on the user (remote operator). Note that the removal includes mitigation of the burden component, in addition to the case of complete removal of the burden component. Here, for simplified description, for example, a vibration component (also called motion component herein) is assumed to be removed from the video signal as a burden component, with the sound signal left unprocessed.

The video/sound compression section 153 executes compression processing on the video signal and the sound signal fed from the burden component removal section 151, and feeds the resultant signals to the data transmission section 154. In this case, for example, an image compression technology, for example, H.264 or MPEG4, is applied to the video signal, and a sound compression technology, for example, AAC, is applied to the sound signal. Note that the video signal or sound signal of each frame is sequentially fed from the video/sound compression section 153 to the data transmission section 154 and that the signal of each frame is provided with, for example, information regarding the time of acquisition of the video signal or the sound signal.

The data transmission section 154 is fed, via the burden component detection section 152, with the vehicle state information acquired from the vehicle state acquisition apparatus 130 and the automated driving information output from the automated driving apparatus 140. The burden component detection section 152, for example, generates vibration removal information used as a reference for removing the vibration component from the acceleration information, and feeds the vibration removal information to the burden component removal section 151. The burden component removal section 151 removes the vibration component from the video signal on the basis of the vibration removal information.

A flowchart in FIG. 3 depicts an example of a processing procedure for vibration component removal in the burden component removal section 151. The processing in the flowchart is executed on each frame of the video signal. The burden component removal section 151 starts processing in step ST1. Next, the burden component removal section 151 acquires the video signal from the video acquisition apparatus 110 in step ST2, and acquires, from the burden component detection section 152, the vibration removal information used as a reference for removing the vibration component, in step ST3.

Subsequently, in step ST4, the burden component removal section 151 calculates, from the vibration removal information, the amount of movement that cancels motion of the automated driving vehicle 100. Then, in step ST5, the burden component removal section 151 executes clip processing on the video signal on the basis of the amount of movement. Then, in step ST6, the burden component removal section 151 ends the processing.

As described above, for each frame of the video signal, the amount of movement that cancels the motion (vibration) of the automated driving vehicle 100 is calculated, and by execution of the clip processing on the video signal on the basis of the amount of movement, the vibration component (shaking component) is removed from the video signal.

In addition, the burden component detection section 152 may feed the data transmission section 154 with the vehicle state information acquired from the vehicle state acquisition apparatus 130 and the automated driving information output from the automated driving apparatus 140 with the information left unprocessed. However, the burden component detection section 152 may selectively feed only the information to be transmitted to the remote operation apparatus 200. Note that the vehicle state information and automated driving information repeatedly acquired in a predetermined period are sequentially fed from the burden component detection section 152 to the data transmission section 154 and that each type of information is provided with the information regarding the time of acquisition of the information.

The vehicle state information fed from the burden component detection section 152 to the data transmission section 154 also includes vibration information as information corresponding to the vibration component to be removed by the burden component removal section 151 as described above. The vibration information is information that is generated in the burden component detection section 152 on the basis of the acceleration information, for example, and that indicates the amount of vibration (magnitude of the vibration).

The data transmission section 154 generates, on the basis of a transmission protocol, transmission data including the video signal and the sound signal fed from the video/sound compression section 153 and the vehicle state information and automated driving information fed from the burden component detection section 152.

Note that, in the illustrated example, the information processing apparatus 150 removes the vibration component from the video signal but that, in an alternative possible configuration, the video acquisition apparatus 110 may acquire the video signal from which the vibration component has been removed. For example, the video acquisition apparatus 110 provided with a camera shake correction function acquires the video signal from which the vibration component has been removed.

The communication apparatus 160 transmits the transmission data generated by the information processing apparatus 150 to the remote operation apparatus 200 via the network 300. In this case, transmission data including the video signal and the sound signal and transmission data including other types of information are transmitted using different logical connections.

FIG. 4 depicts a configuration example of the remote operation apparatus 200. The remote operation apparatus 200 includes a communication apparatus 210, an information processing apparatus 220, and a presentation apparatus 230. The communication apparatus 210 receives the transmission data including the video signal and the sound signal and further including the vehicle state information and the automated driving information, the transmission data being transmitted from the automated driving vehicle 100 via the network 300.

The information processing apparatus 220 includes a data reception section 221, a video/sound decompression section 222, a remote operator (user) state estimation section 223, and a presentation data generation section 224. The data reception section 221 retrieves the video signal and the sound signal as well as the vehicle state information and the automated driving information from the transmission data received at the communication apparatus 210. In an exemplary implementation, the information processing apparatus 150 and the information processing apparatus 220 are encompassed by or may include processing circuitry. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, sections, apparatuses, or means can be hardware that carry out or are programmed to perform the recited functionality. The hardware may be any hardware disclosed herein or otherwise known which is programmed or configured to carry out the recited functionality.

The video/sound decompression section 222 executes decompression processing on the video signal and the sound signal retrieved by the data reception section 221, and then feeds the processed video and sound signals to the presentation data generation section 224. In addition, the vehicle state information and automated driving information retrieved by the data reception section 221 are fed to the presentation data generation section 224.

The remote operator state estimation section 223 estimates the state (physical state) of the remote operator, for example, the level of tension, the level of fatigue, the level of concentration, or the like on the basis of a sensor for the remote operator or an operating input of a steering wheel, a brake pedal, an accelerator pedal, or the like, and feeds the estimation information to the presentation data generation section 224.

The presentation data generation section 224 executes, on the video signal and the sound signal fed from the video/sound decompression section 222, change processing for presenting information to be presented to the remote operator (user) from among the vehicle state information and automated driving information fed from the data reception section 221, to generate presentation data (video signal and sound signal). The presentation data generation section 224 constitutes a presentation control section (control section) that controls presentation.

For example, as described above, the vehicle state information includes vibration information indicating the amount of vibration (magnitude of vibration). The presentation data generation section 224 executes the change processing on the video signal and the sound signal in such a manner that information regarding the vibration component removed from the video signal is presented. For example, change processing is executed on the video signal in such a manner that a band is displayed to overlap video corresponding to the video signal, the band having a width changed depending on a change in the amount of vibration (magnitude of the vibration). In other words, the circuitry visually superimposes the band on the video corresponding to the video signal.

The presentation apparatus 230 presents video and sound on the basis of the presentation data (video signal and sound signal) generated by the presentation data generation section 224 of the information processing apparatus 220. The presentation apparatus 230 includes, for example, a display or a head-mounted display that displays video provided by the video signal, a speaker or a headphone that outputs sound according to the sound signal, and the like.

A flowchart depicted in FIG. 5 illustrates an example of a procedure for processing the video signal for each frame in the remote operation apparatus 200. In step ST11, the remote operation apparatus 200 starts processing. Next, in step ST12, the remote operation apparatus 200 uses the data reception section 221 of the information processing apparatus 220 to receive a video signal.

Then, in step ST13, the remote operation apparatus 200 uses the video/sound decompression section 222 of the information processing apparatus 220 to execute decompression processing on the video signal. Subsequently, in step ST14, the remote operation apparatus 200 uses the presentation data generation section 224 of the information processing apparatus 220 to execute change processing on the video signal in such a manner that bands with a set width and a set color are respectively displayed to overlap video provided by the video signal at upper and lower ends of the video, to generate a video signal for display.

Next, in step ST15, the remote operation apparatus 200 uses the presentation apparatus 230 to display video provided by the video signal for display, in other words, video displayed with the bands with the set width and color respectively to overlap the video at the upper and lower ends. Then, in step ST16, the remote operation apparatus 200 ends the processing.

A flowchart in FIG. 6 depicts an example of a processing procedure for setting the width and the color of the band in the presentation data generation section 224 of the information processing apparatus 220.

In step ST21, the presentation data generation section 224 starts processing. Next, in step ST22, the presentation data generation section 224 receives vibration information as one type of vehicle state information, in other words, receives vibration information from the data reception section 221 as one type of vehicle state information. As described above, the vibration information is information indicating the amount of vibration (magnitude of vibration) of the vibration. Then, in step ST23, the presentation data generation section 224 holds the received vibration information in a buffer.

Subsequently, in step ST24, the presentation data generation section 224 determines whether or not a change in the amount of vibration, in other words, a value obtained by subtracting the last amount of vibration received from the current amount of vibration received, is equal to or greater than a threshold. Here, in a case where the change in the amount of vibration is equal to or greater than the threshold, the presentation data generation section 224 determines that a abrupt vibration (shaking) has occurred.

In a case where the change in the amount of vibration is equal to or greater than the threshold, then in step ST25, the presentation data generation section 224 changes the color of each band to red. Note that the color is not limited to red and may be any prominent color other than a normal color such as white. Next, in step ST26, the presentation data generation section 224 activates a timer. Thereafter, the presentation data generation section 224 proceeds to processing in step ST27. Note that, in a case where the change in the amount of vibration is not equal to or greater than the threshold in step ST24, the presentation data generation section 224 immediately proceeds to step ST27.

In step ST27, the presentation data generation section 224 determines whether or not the timer time has elapsed. The timer time is set to, for example, several seconds. In a case where the timer time has elapsed, then in step ST28, the presentation data generation section 224 changes the color of the band back to the normal white. Subsequently, the presentation data generation section 224 proceeds to processing in step ST29. Note that, in a case where the timer time has not elapsed in step ST27, the presentation data generation section 224 immediately proceeds to processing in step ST29.

In step ST29, the presentation data generation section 224 determines whether or not vibration information corresponding to a predetermined number of samples is stored in the buffer. In a case where vibration information corresponding to the predetermined number of samples is stored, then in step ST30, the presentation data generation section 224 calculates the average value of the vibration information corresponding to the predetermined number of samples. The average value indicates the average amount of vibration (magnitude of the vibration) during a predetermined time corresponding to the predetermined number of samples.

Next, in step ST31, the presentation data generation section 224 sets the width of the band from the average value. In this case, for example, the width of the band is set in a stepwise manner depending on which of multiple level ranges the average value belongs to, and the width of the band increases consistently with the average value in the level range.

Then, in step ST32, the presentation data generation section 224 deletes the vibration information corresponding to the predetermined number of samples in the buffer. Subsequently, the presentation data generation section 224 returns to the processing in step ST22. Processing similar to that described above is repeated. In addition, in a case where the vibration information corresponding to the predetermined number of samples is not stored in step ST29, the presentation data generation section 224 immediately returns to the processing in step ST22.

In a case where, in the processing in the flowchart of FIG. 6, a change in the amount of vibration (value obtained by subtracting the last amount of vibration received from the current amount of vibration received) is monitored and the change is equal to or greater than the threshold, then the color of the band is set to red, and thus the color of the band displayed to overlap the video at the top and bottom thereof is immediately changed to red. Consequently, the user (remote operator) can swiftly recognize the occurrence of a abrupt vibration (shaking). Note that, instead of the color of the band, the aspect of the band may be changed, for example, the pattern of the band may be changed in such a manner as to make the band prominent.

In addition, in the processing in the flowchart of FIG. 6, the width of the band is set on the basis of the average value of the vibration information corresponding to the predetermined number of samples, in other words, the average amount of vibration (magnitude of the vibration) during the predetermined time corresponding to the predetermined number of samples. This enables suppression of more frequent update of the width of the band than necessary, the band being displayed in such a manner as to overlap the video, allowing mitigation of a burden such as fatigue imposed on the user (remote operator).

FIG. 7 depicts an example of video display in a case where the burden component is a vibration component of the video. In the illustrated example, arrows corresponding to the band and indicating opposite directions represent the width of the band changing from hour to hour. FIG. 7(*a*) depicts the case of no vibration (no shaking), with no band indicating the amount of vibration being displayed at the top or bottom of the video. FIG. 7(*b*) depicts the case of vibration occurring (shaking), with the band (white) indicating the amount of vibration being displayed at the top and bottom of the video.

FIG. 7(*c*) depicts the case of violent vibration (violent shaking), with the band (white) indicating the amount of vibration being displayed at the top and bottom of the video. This band has a larger width than that in FIG. 7(*b*). FIG. 7(*d*) depicts the case of abrupt vibration (shaking), with the band displayed at the top and bottom of the video being red in color.

The processing in the flowcharts of FIGS. 6 and 7 described above does not utilize the result of estimation of the remote operator state estimation section 223. The result of estimation of the remote operator state estimation section 223, for example, may further be utilized to present the amount of vibration (magnitude of the vibration).

A flowchart in FIG. 8 depicts an example of a procedure for processing a video signal and a sound signal for each frame in the remote operation apparatus 200 in a case where the result of estimation of the remote operator state estimation section 223, for example, is further utilized to present the amount of vibration (magnitude of the vibration).

In step ST41, the remote operation apparatus 200 starts processing. Next, in step ST42, the remote operation apparatus 200 uses the remote operator state estimation section 223 to estimate the state of the remote operator, here, the level of fatigue. Then, in step ST43, the remote operation apparatus 200 uses the presentation data generation section 224 to determine whether the level of fatigue is equal to or less than a predefined value.

In a case where the level of fatigue is not equal to or less than the predefined value, then in step ST44, the remote operation apparatus 200 uses the presentation data generation section 224 to make settings for reducing the frequency of update of the width of the band and performing sound presentation of the amount of vibration. Here, the sound presentation of the amount of vibration may include output of an alarm sound, increase of the level of traveling noise, or the like performed in a case where vibration whose amount is equal to or greater than a certain level is detected. Subsequently, the remote operation apparatus 200 shifts to processing in step ST45. Note that, in a case where the level of fatigue is equal to or lower than the predefined value in step ST43, the remote operation apparatus 200 immediately shifts to the processing in step ST45.

In step ST46, the remote operation apparatus 200 uses the presentation data generation section 224 to acquire the screen size of the display for displaying the video in the presentation apparatus 230. Then, in step ST46, the remote operation apparatus 200 uses the presentation data generation section 224 to determine whether the screen size is equal to or less than the predefined value.

When the screen size is equal to or less than the predefined value, the remote operation apparatus 200 uses the presentation data generation section 224 to make settings for increasing the frequency of update of the width of the band and additionally displaying the amount of vibration. Here, the additional display of the amount of vibration may be addition of meter display indicating the amount of vibration, for example. Subsequently, the remote operation apparatus 200 shifts to processing in step ST48. Note that, in a case where the screen size is not equal to or less than the predefined value in step ST46, the remote operation apparatus 200 immediately shifts to processing in step ST48.

In step ST48, the remote operation apparatus 200 uses the presentation data generation section 224 to generate a video signal for display and a sound signal for output on the basis of settings in steps ST44 and ST47, in other words, information regarding a change in the presentation of the amount of vibration. Note that, here, the video signal for display is basically generated by the processing executed according to the flowcharts in FIGS. 5 and 6 described above and also with the settings in steps ST44 and ST47. The frequency of update of the width of the band is changed by changing the predetermined number of samples in the flowchart of FIG. 6.

Then, in step ST49, the remote operation apparatus 200 uses the presentation apparatus 230 to display the video provided by the video signal for display, while outputting the sound according to the sound signal for output. Subsequently, in step ST50, the remote operation apparatus 200 ends the processing.

FIG. 9 depicts an example of presentation of the amount of vibration in a case where the level of fatigue of the remote operator is further utilized in the remote operator state estimation section 223. In the illustrated example, arrows corresponding to the band and indicating opposite directions represent the width of the band changing from hour to hour.

FIG. 9(*a*) depicts a case where the level of fatigue of the remote operator is equal to or lower than a predefined value.

FIG. 9(*b*) depicts a case where the level of fatigue of the remote operator is not equal to or lower than the predefined value. In this case, the frequency of update of the width of the band is made lower than that in the case of FIG. 9(*a*) in order to suppress the fatigue of the remote operator. Further, the presentation of only visual information is determined to be insufficient, and sound presentation of the amount of vibration is simultaneously performed. FIG. 9(*c*) depicts a case where the screen size of the display is equal to or less than a predefined value. In this case, the frequency of update of the width of the band is made greater than that in the case of FIG. 9(*a*) in order to allow the remote operator to more easily notice the presentation. Further, meter display is simultaneously provided in order to further facilitate recognition of the amount of vibration by the remote operator.

Note that, in the example described above, from the automated driving vehicle 100 to the remote operation apparatus 200, the video signal from which the vibration component attributed to the vibration of the automated driving vehicle 100 has been removed and the information corresponding to the vibration component (vibration information) are separately transmitted, and the remote operation apparatus 200 performs display of the video provided by the video signal, presentation based on the vibration information, for example, display of the band overlapping the video, the band having a width corresponding to the amount of vibration, and the like.

The following configuration is also possible: from the automated driving vehicle 100 to the remote operation apparatus 200, a video signal from which any other burden component imposing a burden on the user (remote operator), such as skew of the video caused by acceleration and deceleration (yaw, pitch, and roll) of the automated driving vehicle 100, has been removed and information corresponding to the burden component are separately transmitted, and the remote operation apparatus 200 performs display of the video provided by the video signal and presentation based on the information corresponding to the burden component.

In addition, the following configuration is also possible: from the automated driving vehicle 100 to the remote operation apparatus 200, a sound signal from which a burden component such as noise generated around the automated driving vehicle 100 (sound generated by an emergency vehicle, at a construction site, or the like) has been removed and information corresponding to the burden component are separately transmitted, and the remote operation apparatus 200 performs sound output based on the sound signal and presentation based on the information corresponding to the burden component.

For example, a case in which the burden component is sound generated by an emergency vehicle will be described. A flowchart in FIG. 10 depicts an example of a procedure for processing the sound signal in a predetermined period in the automated driving vehicle 100.

In step ST61, the automated driving vehicle 100 starts processing. Next, in step ST62, the automated driving vehicle 100 acquires a sound signal obtained by collecting sound around the automated driving vehicle 100. Then, in step ST63, the automated driving vehicle 100 separates the sound signal acquired into different pieces of data for the respective sound sources.

Subsequently, in step ST64, the automated driving vehicle 100 calculates the level and the direction of the sound source of the emergency vehicle on the basis of the data of the sound source of the emergency vehicle. Next, in step ST65, the automated driving vehicle 100 transmits the information regarding the level and the direction of the sound source of the emergency vehicle to the remote operation apparatus 200 via the network 300, as information corresponding to the burden component.

Then, in step ST66, the automated driving vehicle 100 adjusts the level of each sound source and synthesizes the data of the sound sources to generate a sound signal for transmission. In this case, it is assumed that the sound signal is a sound signal from which the sound of the emergency vehicle has been removed, the sound corresponding to a burden component. Subsequently, in step ST67, the automated driving vehicle 100 compresses the sound signal, and in step ST68, transmits the compressed sound signal to the remote operation apparatus 200 via the network 300, as the sound signal from which the burden component has been removed. Thereafter, in step ST69, the automated driving vehicle 100 ends processing.

A flowchart in FIG. 11 depicts an example of a procedure for processing, in the remote operation apparatus 200, the information regarding the level and the direction of the sound source of the emergency vehicle and the sound signal, the information and the sound signal being transmitted from the automated driving vehicle 100 in the predetermined period.

In step ST71, the remote operation apparatus 200 starts processing. Next, in step ST72, the remote operation apparatus 200 receives the information regarding the level and the direction of the sound source of the emergency vehicle. Then, in step ST73, the remote operation apparatus 200 receives the sound signal. Subsequently, in step ST74, the remote operation apparatus 200 decompresses the sound signal.

Next, in step ST75, the remote operation apparatus 200 determines whether the level of the sound source of the emergency vehicle is equal to or greater than a threshold. In a case where the level of the sound source of the emergency vehicle is equal to or greater than the threshold, then in step ST76, the remote operation apparatus 200 sets the width of the band according to the level of the sound source of the emergency vehicle. Then, in step ST77, the remote operation apparatus 200 sets the arrangement position of the band according to the direction of the sound source of the emergency vehicle.

Subsequently, in step ST78, the remote operation apparatus 200 executes change processing on the video signal in such a manner that the band with the set width is displayed at the set position to overlap video, to generate a video signal for display. Note that the video signal is assumed to be prepared by having been received from the automated driving vehicle 100 and further having been subjected to decompression processing.

After the processing in step ST78, the remote operation apparatus 200 proceeds to processing in step ST79. Note that, in a case where the level of the sound source of the emergency vehicle is not equal to or greater than the threshold in step ST75, the remote operation apparatus 200 immediately proceeds to the processing in step ST79.

In step ST79, the remote operation apparatus 200 displays video on the basis of the video signal for display, and outputs sound on the basis of the received sound signal. Note that, in a case where the level of the sound source of the emergency vehicle is not equal to or greater than the threshold in step ST75, the video signal for display is the video signal itself obtained by having been received and having been subjected to the decompression processing.

After the processing in step ST79, the remote operation apparatus 200 ends the processing in step ST78.

FIG. 12 depicts examples of video display in a case where the burden component is sound generated by the emergency vehicle. FIG. 12(*a*) depicts the case of no emergency vehicle, and hence depicts the case where the level of the sound source of the emergency vehicle is not equal to or greater than the threshold. In this case, no band with a width corresponding to the level of the sound source of the emergency vehicle is displayed to overlap the video.

FIG. 12(*b*) depicts the case of an emergency vehicle being detected, and hence depicts the case where the level of the sound source of the emergency vehicle is equal to or greater than the threshold and where the emergency vehicle is located far on the right side, with the level of the sound source being low. In this case, a band with a small width is displayed to overlap the video at a position on the right side. FIG. 12(*c*) depicts the case of an emergency vehicle being detected, and hence depicts the case where the level of the sound source of the emergency vehicle is equal to or greater than the threshold and where the emergency vehicle is moving closer on the right side, with the level of the sound source being high. In this case, a band with a large width is displayed to overlap the video at a position on the right side. Note that, in this case, the color of the band may be changed, for example, from a normal color, for example, yellow green, to a color indicative of emergency, for example, red.

As described above, in the remote operation system 10 depicted in FIG. 1, the remote operation apparatus 200 performs the presentation based on the presentation signal (video signal and sound signal) from which the burden component has been removed, thus suppressing imposition of a burden on the user (remote operator), for example, causing of fatigue or sickness. In addition, the presentation is performed on the basis of the information corresponding to the burden component, thus enabling the user (remote operator) to easily recognize the burden component removed from the presentation signal, for example, vibration or skew otherwise contained in the video, noise otherwise contained in the sound, or the like. Thus, the user (remote operator) can appropriately perform remote operation.

2. Modification

Note that the preferred embodiment of the present disclosure has been described in detail with reference to the attached drawings but that the technical scope of the present disclosure is not limited to such an example. Obviously, a person having ordinary knowledge in the technical field of the present disclosure can conceive of various changes or modifications within the scope of technical concepts described in the claims, and it is comprehended that the changes or modifications are reasonably within the technical scope of the present disclosure. For example, in the remote operation system 10, a video signal from which a motion component has been removed and a sound signal from which a predetermined sound source component has been removed may be generated. In this case, information corresponding to the motion component and information corresponding to the predetermined sound source component are visually superimposed simultaneously in different positions on the video. In certain embodiments, a first band indicating the motion component may be visually superimposed at upper and lower ends of the video, and a second band indicating the predetermined sound source component may be visually superimposed at left and right ends of the video.

In addition, the effects described herein are merely exemplary or illustrative and not restrictive. In other words, in addition to or instead of the above-described effects, the technology according to the present disclosure can produce effects obvious to a person skilled in the art from the description herein.

Moreover, the present technology can also have the following configurations.

(1)

An information processing system including:

a presentation signal acquisition section that acquires a presentation signal from which a burden component imposing a burden on a user has been removed;

an information acquisition section that acquires information corresponding to the burden component; and a presentation control section that controls presentation based on the presentation signal from which the burden component has been removed and presentation based on the information corresponding to the burden component.

(2)

The information processing system according to (1), in which the presentation signal acquisition section processes the presentation signal including the burden component, on the basis of information regarding the burden component, to acquire the presentation signal from which the burden component has been removed.

(3)

The information processing system according to (1) or (2), in which the presentation signal from which the burden component has been removed is a presentation signal based on a presentation signal acquired by a presentation signal acquisition apparatus mounted in a vehicle.

(4)

The information processing system according to any one of (1) to (3), in which the presentation signal is a video signal, the burden component is a motion component of video, and the presentation control section controls presentation based on a video signal from which the motion component of the video has been removed and presentation based on information corresponding to the motion component of the video.

(5)

The information processing system according to (4) in which the presentation control section displays a band in such a manner that the band overlaps the video provided by the video signal, the band having a width updated depending on an amount of motion of the video.

(6)

The information processing system according to (5), in which the presentation control section changes an aspect of the band when a change in the amount of motion of the video is equal to or greater than a threshold.

(7)

The information processing system according to any one of (1) to (3), in which the presentation signal is a sound signal, the burden component is a predetermined sound source component, and the presentation control section controls presentation based on a sound signal from which the predetermined sound source component has been removed and presentation based on information corresponding to the predetermined sound source component.

(8)

The information processing system according to (7), in which the presentation control section displays a band in such a manner that the band overlaps video provided by a video signal, the band having a width updated depending on a level of the predetermined sound source.

(9)

An information processing method including:

presentation signal acquisition of acquiring a presentation signal from which a burden component imposing a burden on a user has been removed;

information acquisition of acquiring information corresponding to the burden component; and presentation control of controlling presentation based on the presentation signal from which the burden component has been removed and presentation based on the information corresponding to the burden component.

(10)

A presentation control apparatus including:

a control section that controls presentation based on a presentation signal from which a burden component imposing a burden on a user has been removed and presentation based on information corresponding to the burden component.

(11)

The presentation control apparatus according to (10), in which the presentation signal from which the burden component has been removed is a presentation signal based on a presentation signal acquired by a presentation signal acquisition apparatus mounted in a vehicle.

(12)

The presentation control apparatus according to (10) or (11), in which the presentation signal is a video signal, the burden component is a motion component of video, and the control section controls presentation based on a video signal from which the motion component of the video has been removed and presentation based on the information corresponding to the motion component of the video.

(13)

The presentation control apparatus according to (12), in which the control section displays a band in such a manner that the band overlaps the video provided by the video signal, the band having a width updated depending on an amount of motion of the video.

(14)

The presentation control apparatus according to (13), in which the amount of motion of the video is an average amount of motion obtained by averaging the amount of motion of the video every predetermined time.

(15)

The presentation control apparatus according to (13) or (14), in which the control section changes an aspect of the band when a change in the amount of motion of the video is equal to or greater than a threshold.

(16)

The presentation control apparatus according to any one of (13) to (15), in which the control section changes a frequency of update of the width of the band depending on a state of a user.

(17)

The presentation control apparatus according to any one of (13) to (16), in which the control section changes the frequency of update of the width of the band depending on a screen size of a display on which the video provided by the video signal is displayed.

(18)

The presentation control apparatus according to (10) or (11), in which the presentation signal is a sound signal, the burden component is a predetermined sound source component, and the control section controls presentation based on a sound signal from which the predetermined sound source component has been removed and presentation based on information corresponding to the predetermined sound source component.

(19)

The presentation control apparatus according to (18), in which the control section displays a band in such a manner that the band overlaps video provided by a video signal, the band having a width updated depending on a level of the predetermined sound source.

(20)

The presentation control apparatus according to (19), in which the control section changes an arrangement position of the band according to a direction of the predetermined sound source.

(A1)

An information processing system, comprising:

circuitry configured to acquire a video signal from which a motion component has been removed;

acquire information corresponding to the motion component; and display a video corresponding to the video signal from which the motion component has been removed, the video having the information corresponding to the motion component visually superimposed thereon.

(A2)

The information processing system according to (A1), wherein the circuitry is further configured to remove the motion component from an original video signal to acquire the video signal from which the motion component has been removed.

(A3)

The information processing system according to (A2), wherein the original video signal is acquired by a camera mounted in a vehicle.

(A4)

The information processing system according to any one of (A1) to (A3), wherein the circuitry is further configured to visually superimpose a first band on the video.

(A5)

The information processing system according to (A4), wherein the circuitry is further configured to update a width of the first band depending on an amount of the motion component.

(A6)

The information processing system according to (A5), wherein the circuitry is further configured to change an aspect of the first band in response to a change in the amount of the motion component being equal to or greater than a threshold.

(A7)

The information processing system according to (A6), wherein the circuitry is further configured to change a color of the first band in response to a change in the amount of the motion component being equal to or greater than the threshold.

(A8)

The information processing system according to any one of (A4) to (A7), wherein the circuitry is further configured to visually superimpose the first band at upper and lower ends of the video.

(A9)

The information processing system according to any one of (A5) to (A7), wherein the amount of the motion component is an average of a plurality of motion components obtained over a predetermined time.

(A10)

The information processing system according to any one of (A5) to (A9), wherein the circuitry is further configured to change a frequency of update of the width of the first band depending on a state of a remote operator.

(A11)

The information processing system according to any one of (A5) to (A10), wherein the circuitry is further configured to change a frequency of update of the width of the first band depending on a screen size of the display on which the video signal is displayed.

(A12)

The information processing system according to any one of (A1) to (A11), wherein the circuitry is further configured to:

acquire a sound signal from which a predetermined sound source component has been removed;

acquire information corresponding to the predetermined sound source component; and display a video corresponding to a video signal from which the predetermined sound source component has been removed, the video having the information corresponding to the predetermined sound source component visually superimposed thereon.

(A13)

The information processing system according to (A12), wherein the circuitry is further configured to visually superimpose a second band on the video, and update a width of the second band depending on an amount of the predetermined sound source component.

(A14)

The information processing system according to (A13), wherein the circuitry is further configured to visually superimpose a first band on the video and update a width of the first band depending on an amount of the motion component.

(A15)

The information processing system according to (A14), wherein the circuitry is further configured to visually superimpose the first band at upper and lower ends of the video, and visually superimpose the second band at left and right ends of the video.

(A16)

The information processing system according to any one of (A13) to (A15), wherein the circuitry is further configured to change an arrangement position of the second band according to a direction of the predetermined sound source.

(A17)

The information processing system according to any one of (A13) to (A16), wherein the circuitry is further configured to change a color of the second band according to a type of the predetermined sound source.

(A18)

An information processing method, comprising:

acquiring a video signal from which a motion component has been removed;

acquiring information corresponding to the motion component; and displaying a video corresponding to the video signal from which the motion component has been removed, the video having the information corresponding to the motion component visually superimposed thereon.

(A19)

A display control apparatus, comprising:

circuitry configured to display a video corresponding to a video signal from which a motion component has been removed, the video having information corresponding to the motion component visually superimposed thereon.

REFERENCE SIGNS LIST

10: Remote operation system
100: Automated driving vehicle
110: Video acquisition apparatus
120: Sound acquisition apparatus
130: Vehicle state acquisition apparatus
140: Automated driving apparatus
150: Information processing apparatus
151: Burden component removal section
152: Burden component detection section
153: Video/sound compression section
154: Data transmission section
160: Communication apparatus
200: Remote operation apparatus
210: Communication apparatus
220: Information processing apparatus
221: Data reception section
222: Video/sound decompression section
223: Remote operator state estimation section
224: Presentation data generation section
230: Presentation apparatus
300: Network
400: Connection management apparatus

The invention claimed is:

1. An information processing system, comprising:

circuitry configured to acquire a video signal from which a motion component has been removed;

acquire motion information corresponding to the motion component; and display a video corresponding to the video signal from which the motion component has been removed, the video having the motion information corresponding to the motion component visually superimposed thereon, wherein the circuitry is further configured to visually superimpose a first band on the video; and update a width of the first band depending on an amount of the motion component.

2. The information processing system according to claim 1, wherein the circuitry is further configured to remove the motion component from an original video signal to acquire the video signal from which the motion component has been removed.

3. The information processing system according to claim 2, wherein the original video signal is acquired by a camera mounted in a vehicle.

4. The information processing system according to claim 1, wherein the circuitry is further configured to change an aspect of the first band in response to a change in the amount of the motion component being equal to or greater than a threshold.

5. The information processing system according to claim 4, wherein the circuitry is further configured to change a color of the first band in response to the change in the amount of the motion component being equal to or greater than the threshold.

6. The information processing system according to claim 1, wherein the circuitry is further configured to visually superimpose the first band at upper and lower ends of the video.

7. The information processing system according to claim 1, wherein the amount of the motion component is an average of a plurality of motion components obtained over a predetermined time.

8. The information processing system according to claim 1, wherein the circuitry is further configured to change a frequency of update of the width of the first band depending on a state of a remote operator.

9. The information processing system according to claim 1, wherein the circuitry is further configured to change a frequency of update of the width of the first band depending on a screen size of a display on which the video signal is displayed.

10. An information processing system comprising:

circuitry configured to acquire a video signal from which a motion component has been removed;

acquire motion information corresponding to the motion component;

acquire a sound signal from which a predetermined sound source component has been removed, the sound signal being corresponding to the video signal;

acquire sound source information corresponding to the predetermined sound source component; and present a video corresponding to the video signal from which the motion component has been removed, and a sound corresponding to the sound signal from which the predetermined sound source component has been removed, the video having the motion information corresponding to the motion component and the sound source information corresponding to the predetermined sound source component visually superimposed thereon.

11. The information processing system according to claim 10, wherein the circuitry is further configured to visually superimpose a second band on the video, and update a width of the second band depending on an amount of the predetermined sound source component.

12. The information processing system according to claim 11, wherein the circuitry is further configured to visually superimpose a first band on the video, and update a width of the first band depending on an amount of the motion component.

13. The information processing system according to claim 12, wherein the circuitry is further configured to visually superimpose the first band at upper and lower ends of the video, and visually superimpose the second band at left and right ends of the video.

14. The information processing system according to claim 11, wherein the circuitry is further configured to change an arrangement position of the second band according to a direction of a sound source of the predetermined sound source component.

15. The information processing system according to claim 11, wherein the circuitry is further configured to change a color of the second band according to a type of the predetermined sound source component.

16. An information processing method, comprising:

acquiring a video signal from which a motion component has been removed;

acquiring motion information corresponding to the motion component; and displaying a video corresponding to the video signal from which the motion component has been removed, the video having the motion information corresponding to the motion component visually superimposed thereon, wherein the method further comprises, visually superimposing a first band on the video, and updating a width of the first band depending on an amount of the motion component.

* * * * *